US012736072B2

(12) United States Patent
Army et al.

(10) Patent No.: US 12,736,072 B2
(45) Date of Patent: Sep. 15, 2026

(54) LOW SOLIDITY COALESCING TUBE BUNDLE ELBOW

(71) Applicant: Hamilton Sundstrand Corporation, Charlotte, NC (US)

(72) Inventors: Donald E. Army, Enfield, CT (US); Patrick McCord, Norwich, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 650 days.

(21) Appl. No.: 18/118,468

(22) Filed: Mar. 7, 2023

(65) Prior Publication Data

US 2024/0302110 A1 Sep. 12, 2024

(51) Int. Cl.

*F15D 1/04* (2006.01)
*B01D 45/12* (2006.01)
*B64D 13/00* (2006.01)
*B01D 45/16* (2006.01)

(52) U.S. Cl.

CPC ............... *F15D 1/04* (2013.01); *B01D 45/12* (2013.01); *B64D 13/00* (2013.01); *B01D 45/16* (2013.01)

(58) Field of Classification Search

CPC ........... F15D 1/04; B01D 45/12; B01D 45/16; B64D 13/00

See application file for complete search history.

(56) References Cited

U.S. PATENT DOCUMENTS 4,212,351 A 7/1980 Tanner et al.
4,333,835 A 6/1982 Lynch
5,255,716 A * 10/1993 Wilcox ................. F16L 55/027 138/40
5,393,587 A * 2/1995 Machida ................... F16L 9/18 428/116
5,455,097 A * 10/1995 Machida ............... F01N 13/009 428/116
5,456,965 A * 10/1995 Machida ............... F01N 3/2803 428/116
5,529,084 A * 6/1996 Mutsakis .................. F15D 1/04 137/13

(Continued)

FOREIGN PATENT DOCUMENTS

CN 106287087 A 1/2017
CN 211913188 U 11/2020

(Continued)

OTHER PUBLICATIONS

Extended European Search Report for European Patent Application No. 24158314.5, Dated May 27, 2024, 6 Pages.

*Primary Examiner* — Devon Lane

(74) *Attorney, Agent, or Firm* — Kinney & Lange, P.A.

(57) ABSTRACT

A coalescing tube bundle elbow for a water collector includes an inlet end, an outlet end, and a body section fluidly connecting the inlet and outlet ends. The inlet end can receive a fluid flow in an at least partially gaseous state in an incoming direction. The outlet end can discharge the fluid flow in an at least partially liquid state in an outgoing direction. The body section can condense at least a portion of the fluid flow from a gaseous state into a liquid state. The body section includes channels which are defined by channel walls and which extend along the body section from the inlet end to the outlet end, and has a curved profile such that the outgoing direction of the fluid flow is not parallel to the incoming direction of the fluid flow.

14 Claims, 11 Drawing Sheets

(56) References Cited

U.S. PATENT DOCUMENTS

| | | | | |
|---|---|---|---|---|
| 5,531,484 | A * | 7/1996 | Kawano | F16L 43/00 285/179.2 |
| 10,260,537 | B2 * | 4/2019 | Sawchuk | F15D 1/001 |
| 10,378,566 | B2 * | 8/2019 | Kumar | G01F 1/6842 |
| 10,864,993 | B2 | 12/2020 | Alahyari | |
| 11,085,470 | B2 * | 8/2021 | Leutwyler | F04B 53/16 |
| 2005/0263199 | A1 * | 12/2005 | Meheen | F15D 1/0005 138/44 |
| 2009/0218000 | A1 * | 9/2009 | Pfau | F16L 55/02763 138/40 |
| 2011/0048065 | A1 * | 3/2011 | Petersen | F01P 11/04 95/260 |
| 2012/0255712 | A1 * | 10/2012 | Kirchner | F28B 1/02 165/113 |
| 2014/0338771 | A1 * | 11/2014 | Brown | F15D 1/025 138/40 |
| 2019/0276155 | A1 * | 9/2019 | Walsh | B01D 5/0081 |
| 2020/0378414 | A1 * | 12/2020 | Leutwyler | F15D 1/0025 |
| 2022/0099114 | A1 * | 3/2022 | Harris | F15D 1/025 |
| 2023/0166845 | A1 * | 6/2023 | McCord | B01D 45/16 244/118.5 |
| 2025/0312867 | A1 * | 10/2025 | Komatsu | B23K 26/1476 |

FOREIGN PATENT DOCUMENTS

| | | | |
|---|---|---|---|
| DE | 102015015715 | A1 | 6/2017 |
| EP | 0233332 | A1 | 8/1987 |
| GB | 2135210 | B | 9/1985 |
| JP | 2007229583 | A | 9/2007 |
| WO | 2005079950 | A1 | 9/2005 |

* cited by examiner 202
200
204
$C_2$
214
206
220
210
218
216
208
212

202
200
204
220
214
206
210
216
208
218
212

302
300
304
$C_3$
306
314
310
320
318
320
316
320
308
312

302
300
304
320
320
320
306
320
314
320
310
320
316
308
312
318

400
402
404
406
408
410
412
414
416
418
420
$C_4$

LOW SOLIDITY COALESCING TUBE BUNDLE ELBOW

BACKGROUND

The present invention relates generally to environmental control systems and in particular to a defogging elbow for a water collector.

Environmental control systems can be used to condition air for the cabin of an aircraft so that the air is at a suitable temperature and pressure for the crew and any passengers aboard the aircraft. Environmental control systems typically include at least one turbine and at least one heat exchanger, which each extract energy from the flow of air through the system. The cooling of the air causes water vapor present in the air to condense. This water vapor is removed from the air as it passes through the environmental control system in order to prevent ice formation within the system, as well as to reduce fogging within the cabin and/or cockpit.

Many environmental control systems include both a condenser (for facilitating the condensation of the water vapor in the air) and a water collector (for collecting the condensed water). In systems with two turbines, these components are typically located between turbines. It is advantageous to eliminate system components where possible in order to decrease system weight and complexity. However, environmental control systems lacking condensers generally have decreased reliability, as water in the turbine section of an air cycle machine (ACM) can lead to erosion, icing, and imbalance of the turbine.

SUMMARY

As discussed herein, a coalescing tube bundle elbow for a water collector includes an inlet end, an outlet end, and a body section fluidly connecting the inlet and outlet ends. The inlet end can receive a fluid flow in an at least partially gaseous state in an incoming direction. The outlet end can discharge the fluid flow in an at least partially liquid state in an outgoing direction. The body section can condense at least a portion of the fluid flow from a gaseous state into a liquid state. The body section includes channels defined by a plurality of channel walls and extending along the body section from the inlet end to the outlet end, and has a curved profile such that the outgoing direction of the fluid flow is not parallel to the incoming direction of the fluid flow.

As further discussed herein, a mid-pressure water collector includes a coalescing tube bundle elbow, a swirl vane section, and a water collection section. The coalescing tube bundle elbow includes an inlet end, an outlet end, and a body section fluidly connecting the inlet and outlet ends. The inlet end can receive a fluid flow in an at least partially gaseous state in an incoming direction. The outlet end can discharge the fluid flow in an at least partially liquid state in an outgoing direction. The body section can condense at least a portion of the fluid flow from a gaseous state into a liquid state. The body section includes channels defined by a plurality of channel walls and extending along the body section from the inlet end to the outlet end, and has a curved profile such that the outgoing direction of the fluid flow is not parallel to the incoming direction of the fluid flow. The swirl vane section is downstream of the coalescing tube bundle elbow and is fluidly connected to the outlet end of the coalescing tube bundle elbow. The swirl vane section includes a swirl vane assembly and an inlet duct surrounding the swirl vane assembly. The water collection section is downstream of the swirl vane section and is fluidly connected to the swirl vane assembly. The water collection section includes a water collection can and an ejector.

As also discussed herein, a method of condensing water vapor from an air flow within a water collection system includes receiving a fluid flow in an at least partially gaseous state in an incoming direction with an inlet end of a CTB elbow. At least a portion of the fluid flow is condensed from a gaseous state into a liquid state with a body section of the CTB elbow by directing the fluid flow through a plurality of channels extending along the body section from the inlet end to the outlet end and along a curved profile of the body section. This changes a direction of the fluid flow such that an outgoing direction of the fluid flow is not parallel to the incoming direction of the fluid flow. The fluid flow in an at least partially liquid state is discharged in the outgoing direction with an outlet end of the CTB elbow. The fluid flow is spun along a swirl vane inlet duct with a swirl vane assembly and thereby separating a liquid portion of the fluid flow from a gas portion of the fluid flow. A swirl vane section which is downstream of the CTB elbow and fluidly connected to the outlet end of the CTB elbow comprises the swirl vane inlet duct and the swirl vane assembly. The liquid portion of the fluid flow is collected with a water collection can of a water collection section which is downstream of the swirl vane section and fluidly connected to the swirl vane section. The gas portion of the fluid flow is directed out of the water collection can.

The present summary is provided only by way of example, and not limitation. Other aspects of the present disclosure will be appreciated in view of the entirety of the present disclosure, including the entire text, claims, and accompanying figures.

Figure 1:
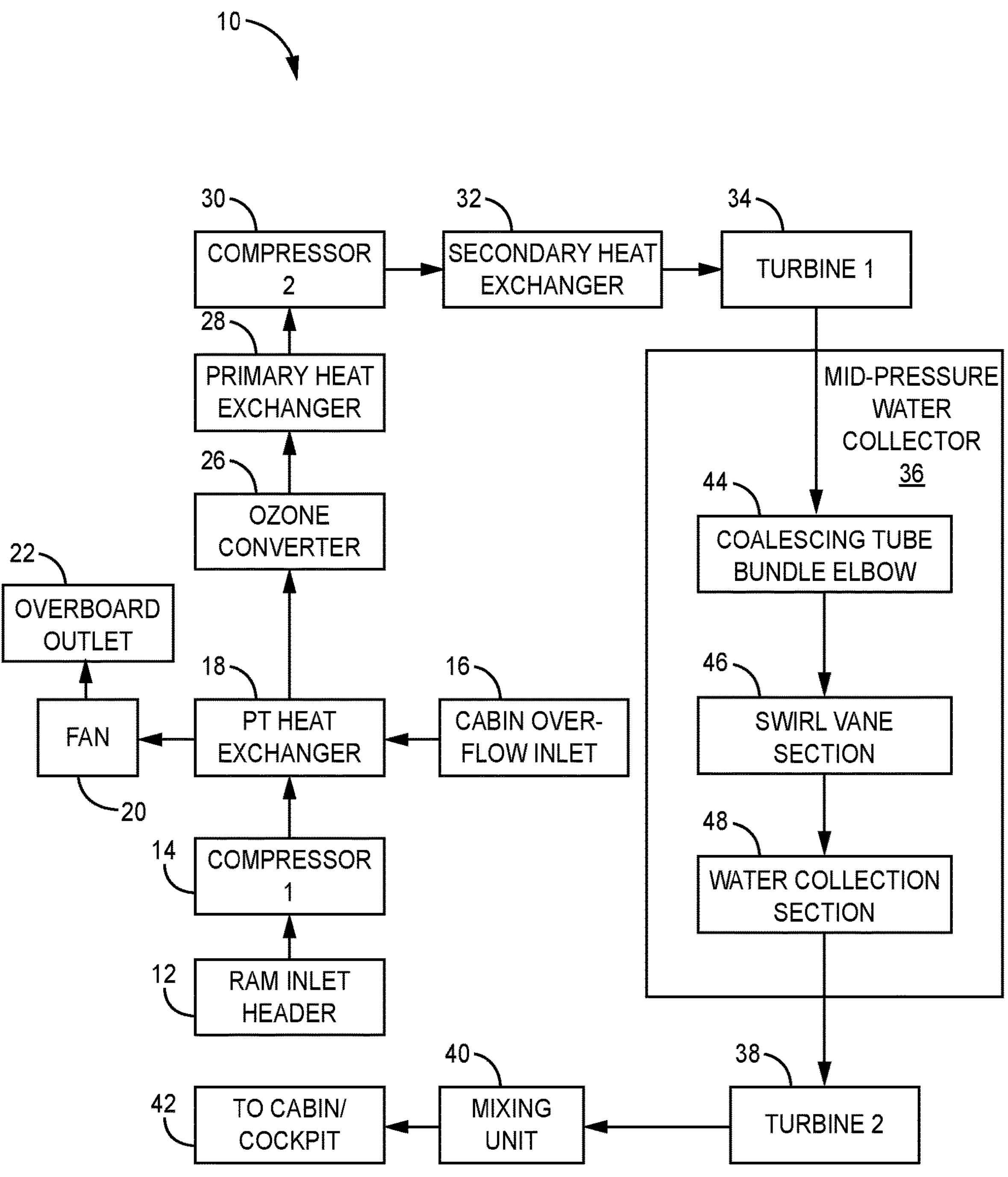
FIG. 1 is a schematic depiction of an air generation unit which includes a mid-pressure water collector (MPWC).

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A low-solidity design for a coalescing tube bundle (CTB) elbow can be used upstream of a centrifugal water collector, and can replace a traditional condenser heat exchanger in an environmental control system (ECS). The low-solidity design of the elbow can be additively manufactured to include channels which are shaped to allow fog to coalesce on the walls of the channels. The turn in the elbow, in combination with the channels, provides more surface area over a compact length.

Figure 2:
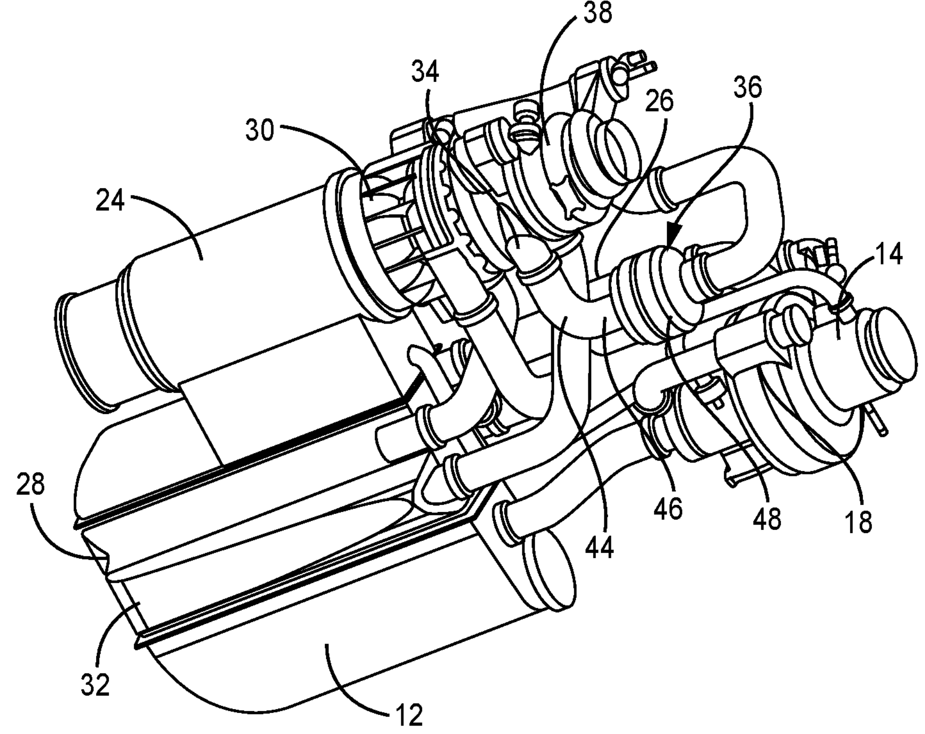
FIG. 2 is a perspective view of an environmental control system (ECS) with a compact MPWC.

FIG. 1 is a schematic depiction of air flow through air generation unit 10. Air generation unit 10 includes ram inlet header 12, first compressor 14, cabin overflow inlet 16, PT heat exchanger 18, fan 20, overboard outlet 22, fan inlet plenum 24 (see FIG. 2; not shown in FIG. 1), ozone converter 26, primary heat exchanger 28, second compressor 30, secondary heat exchanger 32, first turbine 34, mid-pressure water collector (MPWC) 36, second turbine 38, mixing unit 40, and cabin/cockpit 42. MPWC 36 includes CTB elbow 44, swirl vane section 46, and water collection section 48. FIG. 2 is a perspective view of a portion of air generation unit 10 which includes ram inlet header 12, first compressor 14, PT heat exchanger 18, fan inlet plenum 24, ozone converter 26, primary heat exchanger 28, second compressor 30, secondary heat exchanger 32, first turbine 34, mid-pressure water collector (MPWC) 36, second turbine 38, CTB elbow 44, swirl vane section 46, and water collection section 48. FIGS. 1-2 will be discussed concurrently below.

The example shown in FIGS. 1-2 is a four-wheel ACM with turbines 34 and 38, compressor 30, and fan 20 on a common shaft. Ram inlet header 12 can intake ram air from an external environment of the aircraft. First compressor 14 receives the air from ram inlet header 12 and compresses it. Even at the low temperatures present at high altitudes, the compression of the air to bring it to a pressure suitable for use within the cockpit and/or cabin raises the temperature sufficiently to require cooling of the airflow. The compressed air then flows past PT heat exchanger 18 and through ozone converter 26, which converts ozone ($O_3$) present in the air to oxygen ($O_2$). Cabin overflow air can be used as the second fluid in PT heat exchanger 18, and can then be drawn through fan 20 and discharged overboard through overboard outlet 22. The air flows into primary heat exchanger 28, which transfers heat out of the air and lowers the air temperature. The air then flows into second compressor 30 and secondary heat exchanger 32 to be further compressed and cooled. The re-compressed and re-cooled air then enters first turbine 34, which extracts heat energy from the air flow. The air flows into MPWC 36, which condenses and collects water from the air. Within MPWC 36, CTB elbow 44 changes the flow direction of the air, thereby allowing water droplets to form on channel walls within CTB elbow 44. Swirl vane section 46 directs the air flow outward, centrifugally removing the water droplets from the air flow and allowing the droplets to form rivulets. Water collection section 48 then collects the water removed from the air flow and passes the air into second turbine 38, which removes additional heat energy from the air. The air can then pass through mixing unit 40, which can receive additional air flows from other air generation units 10 within the aircraft, before being directed to cabin/cockpit 42.

Figure 3A:
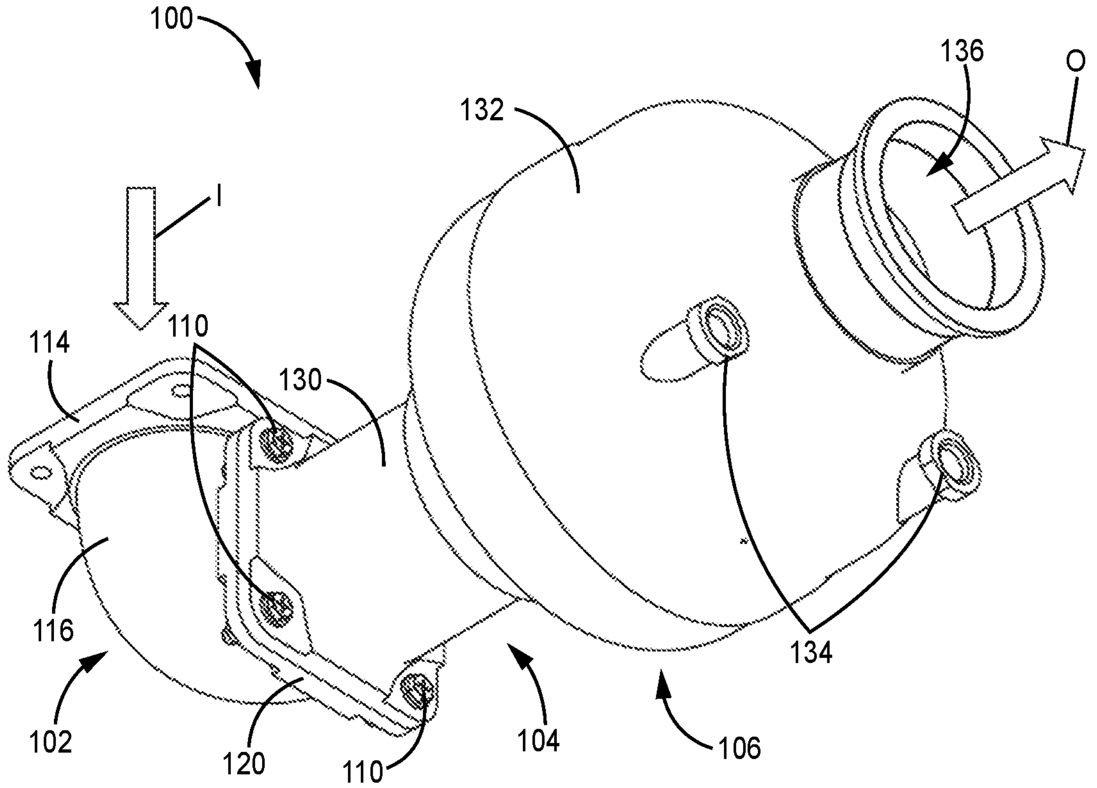
FIG. 3A is a perspective view of the compact MPWC of FIG. 2.
Figure 3B:
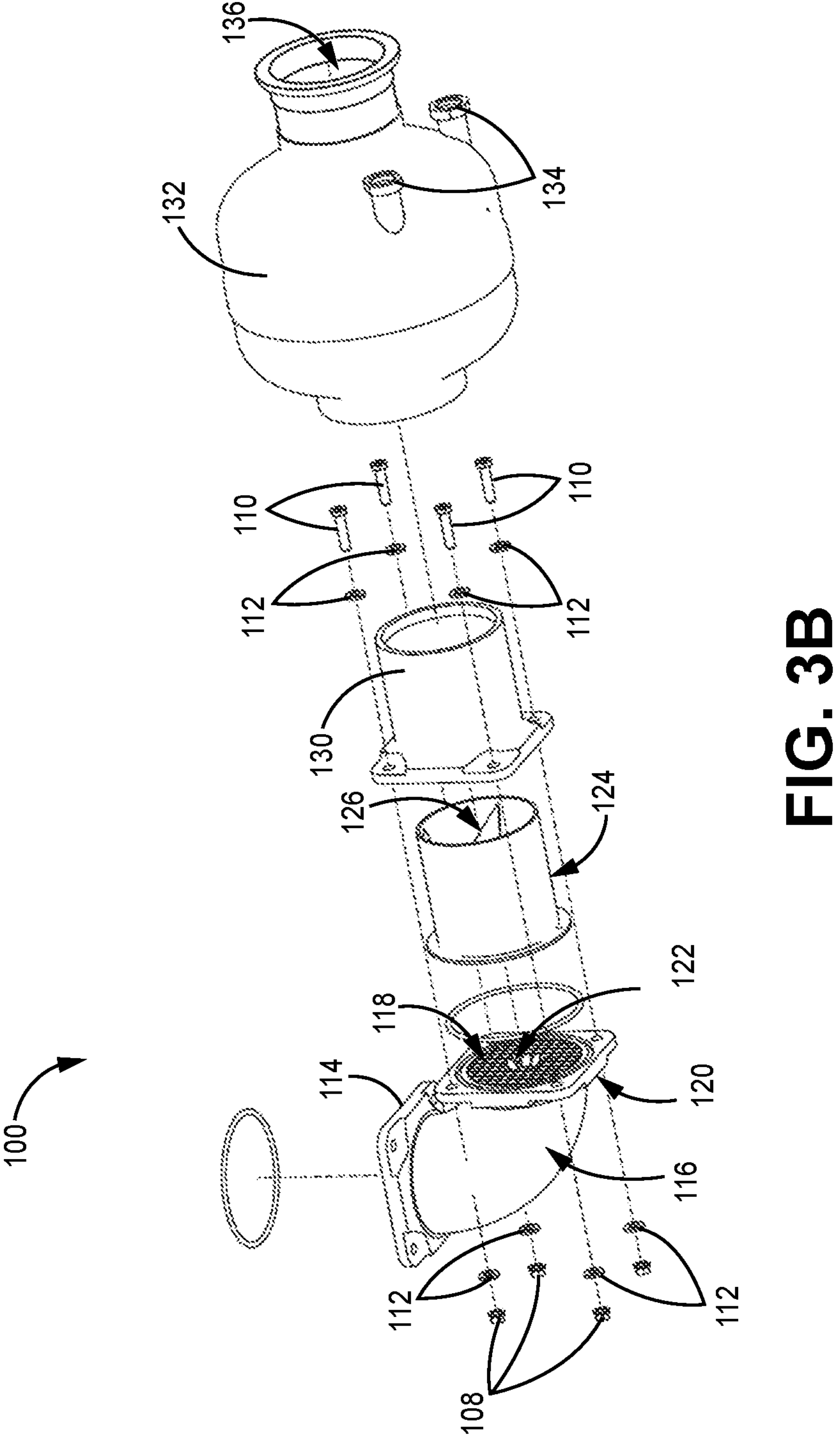
FIG. 3B is an exploded view of the compact MPWC of FIG. 2.
Figure 3C:
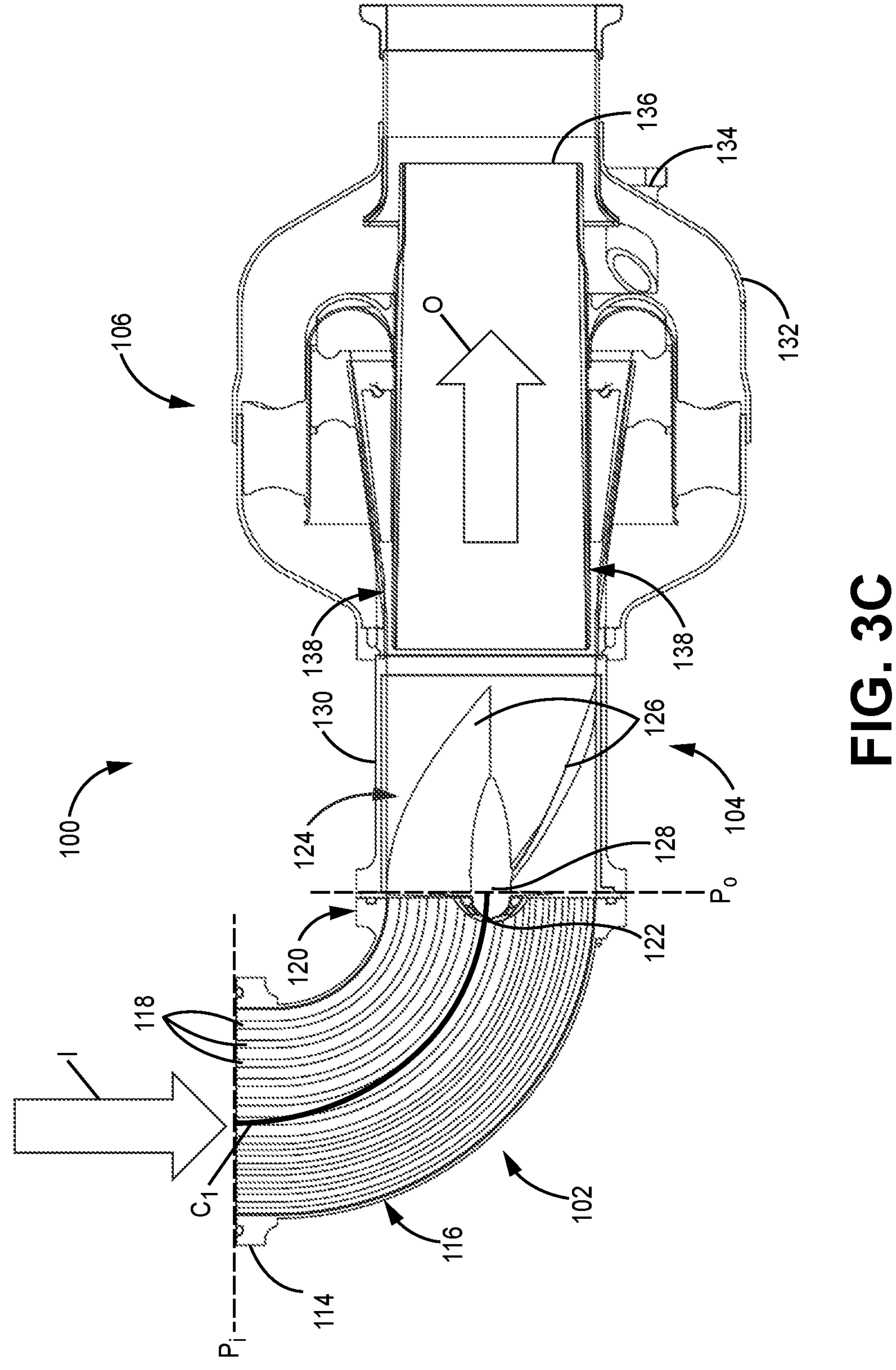
FIG. 3C is a cross-sectional view of the compact MPWC of FIG. 2.

FIG. 3A is a perspective view of MPWC 100. MPWC 100 includes CTB elbow 102, swirl vane section 104, water collection section 106, nuts 108 (shown in FIG. 3B), bolts 110, and washers 112 (shown in FIG. 3B). CTB elbow 102 is oriented about principal curve $C_1$, and includes inlet end 114, body section 116 including channels 118 (shown in FIGS. 3B-3C), and outlet end 120 including recess 122 (shown in FIGS. 3B-3C). Swirl vane section 104 includes swirl vane assembly 124 (shown in FIG. 3B; includes vanes 126 and swirl vane center body 128, shown in FIG. 3C) and swirl vane inlet duct 130. Water collection section 106 includes water collection can 132, drain ports 134, ejector 136, and scupper gap 138 (shown in FIG. 3C). FIG. 3B is an exploded view of MPWC 100. FIG. 3C is a cross-sectional view of MPWC 100. FIGS. 3A-3C will be discussed concurrently below.

Principal curve $C_1$ is the geometrical center of CTB elbow 102 along the direction of a fluid flow through CTB elbow 102 during operation. Plane $P_i$ of inlet end 114 and plane $P_o$ of outlet end 120 (both shown in FIG. 3C) are orthogonal to principal curve $C_1$. Inlet end 114 is an upstream end of CTB elbow 102 with respect to the direction of fluid flow along principal curve $C_1$, body section 116 is downstream of inlet end 114, and outlet end 120 is downstream of body section 116. Body section 116 fluidly connects inlet end 114 to outlet end 120. Body section 116 has a curved profile such that inlet end 114 is not parallel to outlet end 120. In some examples, body section 116 can curve approximately 90 degrees such that CTB elbow 102 turns approximately 90 degrees between inlet end 114 and outlet end 120. In other examples, body section 116 can curve more or less than 90 degrees. As described in more detail below, channels 118 within body section 116 can be shaped to facilitate the defogging of a fluid flow through CTB elbow 102 through condensation.

CTB elbow 102 can utilize bolted or V-band flanges. Connectors (such as nuts 108, bolts 110, and washers 112) can be used to connect CTB elbow 102 to other components of MPWC 100, such as swirl vane inlet duct 130. Additionally or alternatively, CTB elbow 102 can be brazed or welded to other components, or formed together with part of swirl vane section 104 such as swirl vane inlet duct 130. Some or all of the sections of CTB elbow 102 (inlet end 114, body section 116, and/or outlet end 120) can be additively manufactured, and can in some examples be built in a build direction that is not parallel to any channel walls of channels 118.

As turbine outlet fog enters CTB elbow 102, it is driven towards the outer radius of each channel 118 due to centrifugal force. The fog coalesces into droplets and eventually forms rivulets which then enter swirl vane section 104. Vanes 126 of swirl vane assembly 124 spin the water to the inner diameter of swirl vane inlet duct 130, where it is directed towards scupper gap 138. Ejector 136 is downstream of swirl vane section 104, and works to reduce the pressure within the outer chambers of water collection can 132. This helps to encourage water to move through scupper gap 138. As the area increases, the flow velocity of the water is reduced. The liquid water, aided by gravity, falls to the bottom of water collection can 132, where it pools and can be removed for use elsewhere in the system.

As described in more detail below, channels 118 can be arranged and shaped such that they form a low solidity design within CTB elbow 102. This pattern of channels 118 can be extruded along the centerline of an elbow in order to maximize the surface area for turbine fog to coalesce. In some examples, channels 118 can include geometry with corners (for example, channels with hexagonal or quadrilateral cross sections) to provide pockets for coalescing water to form into rivulets as it flows through each channel 118. The elbow angle of CTB elbow 102 from inlet end 114 to outlet end 120 can be approximately 90 degrees, or greater or less than 90 degrees.

Figures 4A, 4B:
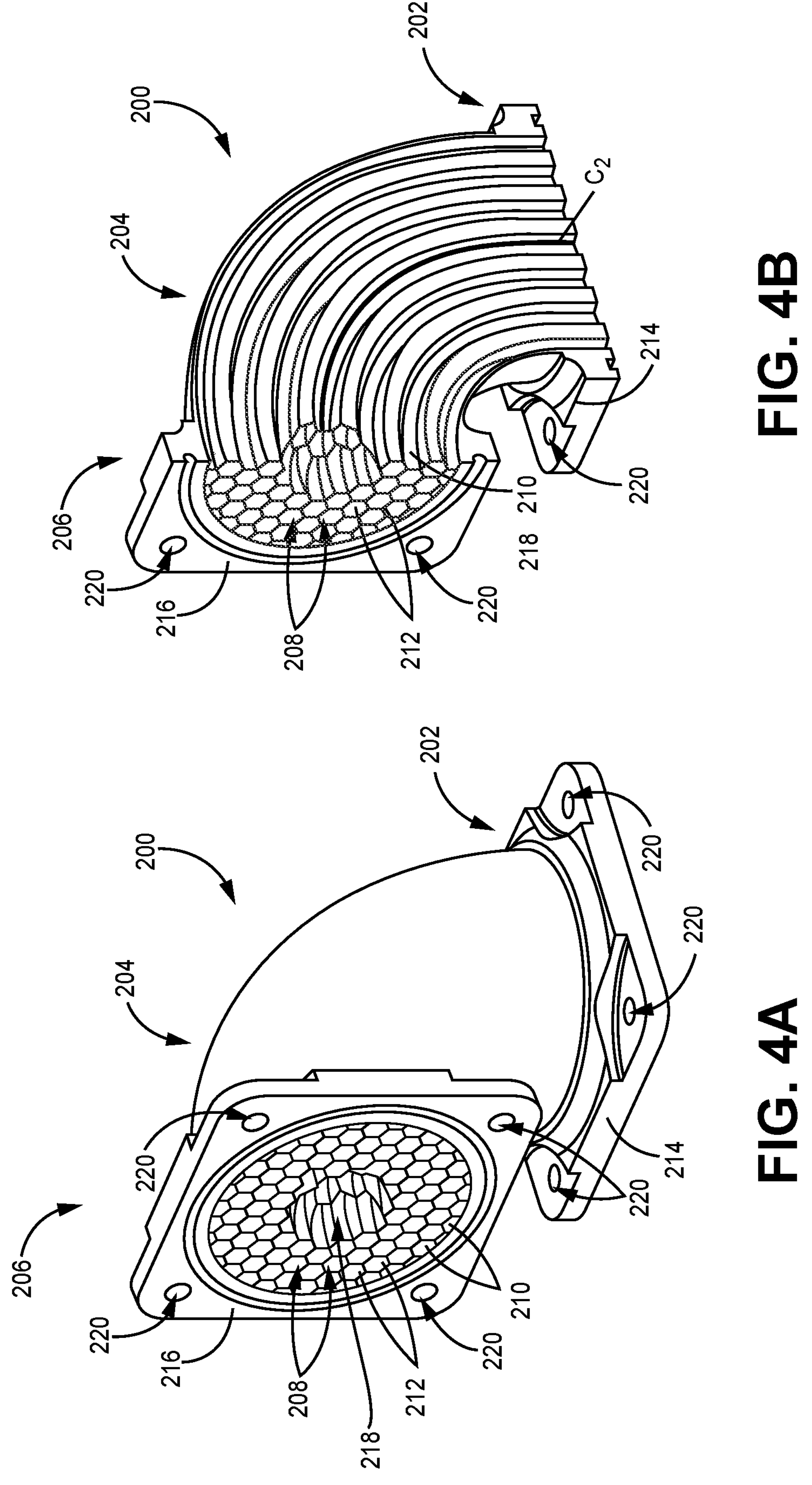
FIG. 4A is a perspective view of a coalescing tube bundle (CTB) elbow having hexagonal channels for use in a MPWC.
FIG. 4B is a perspective view of a cross section of the CTB elbow of FIG. 4A.
Figures 4C, 4D:
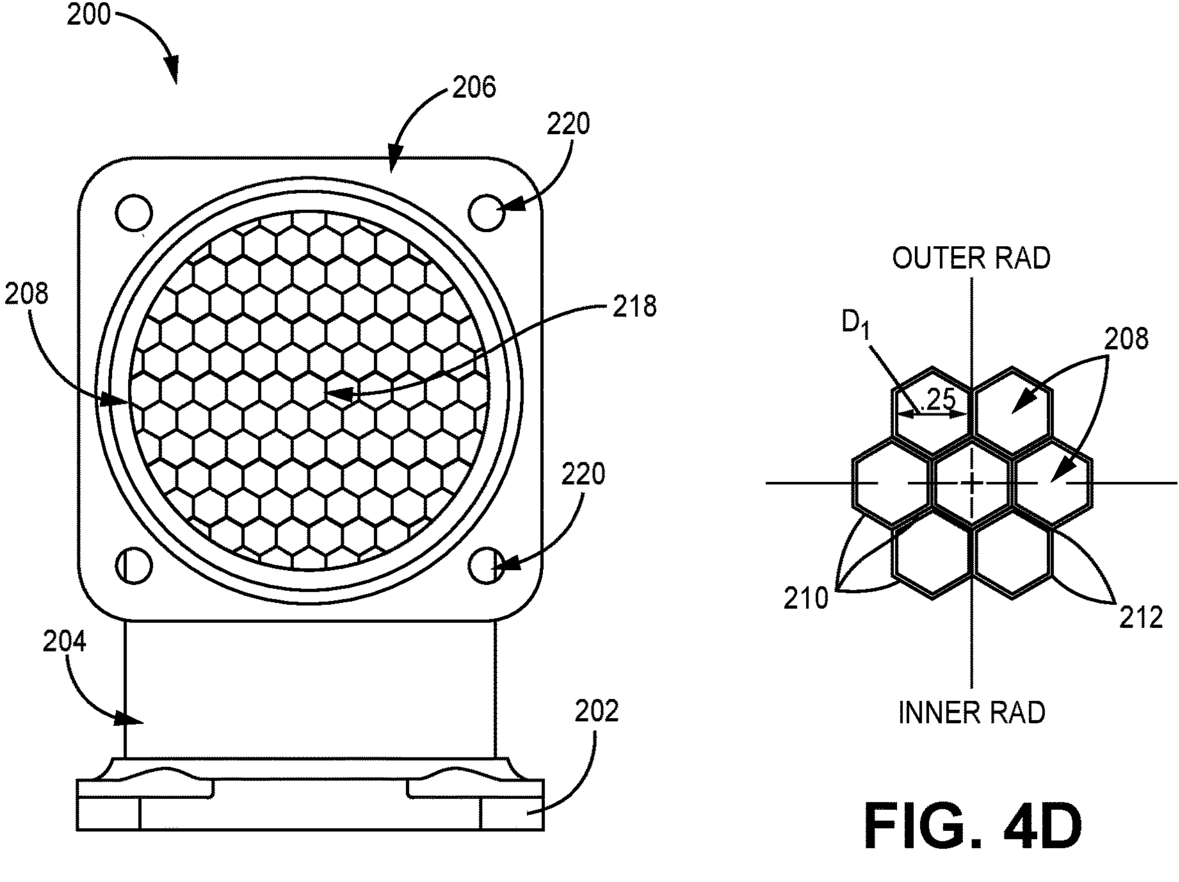
FIG. 4C is a side elevation view of the CTB elbow of FIG. 4A.
FIG. 4D is a cross-sectional view of the hexagonal channels within the CTB elbow of FIG. 4A.

FIG. 4A is a perspective view of CTB elbow 200. CTB elbow 200 is oriented along principal curve $C_2$ and includes inlet end 202, body section 204, and outlet end 206. Body section 204 includes channels 208, channel walls 210, and corners 212. In the examples shown in FIGS. 4A-4C, inlet end 202 includes inlet mounting plate 214, and outlet end 206 includes outlet mounting plate 216 and recess 218. Inlet mounting plate 214 and outlet mounting plate 216 can each include openings 220 for receiving connectors (such as, for example, nuts 108 and bolts 110 shown in FIG. 3B). FIG. 4B is a perspective view of a cross section of CTB elbow 200. FIG. 4C is a side elevation view of CTB elbow 200. FIG. 4D is a cross-sectional view of channels 208 within CTB elbow 200. FIGS. 4A-4D will be discussed concurrently below.

As described above in reference to FIGS. 3A-3C, body section 204 is downstream of inlet end 202, and outlet end 206 is downstream of body section 204. Body section 204 fluidly connects inlet end 202 to outlet end 206. Body section 204 has a curved profile such that inlet end 202 is not parallel to outlet end 206. In some examples, body section 204 can curve approximately 90 degrees such that CTB elbow 200 turns approximately 90 degrees between inlet end 202 and outlet end 206. In other examples, body section 204 can curve more or less than 90 degrees.

Channels 208 extend lengthwise along body section 204 from inlet end 202 to outlet end 206. Corners 212 are formed by the intersection of two or more channel walls 210. In the example shown in FIGS. 4A-4D, channels 208 have a hexagonal cross section in the direction perpendicular to the fluid flow through channels 208 during operation. The hexagonal cross section of each channel 208 is defined by the channel walls 210 surrounding each channel 208. Each channel 208 shares at least one channel wall 210 with at least one other channel 208, and each channel 208 thereby directly abuts the channel(s) 208 with which it shares channel wall(s) 210. In some examples, the thickness of channel walls 210 can be approximately 0.020 inches. The size of channels 208 can be uniform or can vary within body section 204. In the example shown in FIG. 4D, the diameter $D_1$ of each channel 208 (from a midpoint of each channel wall 210 to a midpoint of the channel wall 210 across the channel 208) is approximately 0.25 inches. In some examples, the diameter of each channel 208 can be approximately 0.375 inches.

Inlet mounting plate 214 and outlet mounting plate 216 can secure CTB elbow 200 to other components of a MPWC. For example, outlet mounting plate 216 can secure outlet end 206 to a swirl vane section (such as swirl vane section 104 described above in reference to FIGS. 3A-3C). Recess 218 can allow CTB elbow 200 to fit over a swirl vane center body (such as swirl vane center body 128 described above in reference to FIGS. 3A-3C).

During operation, inlet end 202 receives a fluid flow in an at least partially gaseous state in incoming direction I. This fluid flow can be air with water vapor. The fluid flow enters body section 204 through channels 208. As the fluid flows along channels 208, the flow direction diverges from incoming direction I due to the curved shape of body section 204. The fluid is defogged as it passes through channels 208 due to condensation of the vapor on channel walls 210 (particularly at corners 212). After the fluid flow has passed through channels 208, outlet end 206 discharges the fluid flow, in an at least partially liquid state, in outgoing direction O. Outgoing direction O is different than incoming direction I, and in some examples is not parallel to incoming direction I. CTB elbow 200 can be used in a MPWC (such as MPWC 100 described above in reference to FIGS. 3A-3C).

The hexagonal shape of channels 208 allow each channel 208 to efficiently share channel walls 210 with the adjacent channels 208, while providing a low solidity design for minimum obstruction to the air flow through CTB elbow 200. The size and length-to-diameter ratio of channels 208 can be varied to improve the performance of the particular system in which CTB elbow 200 is used. Corners 212 formed by the hexagonal geometry provide pockets for coalescing water to form into rivulets as it flows through each channel 208. Channels 208 can have a surface finish of approximately 250 Ra (an average surface variation of approximately 250 microinches or 6.3 micrometers) to further reduce flow obstruction through CTB elbow 200.

Figures 5A, 5B:
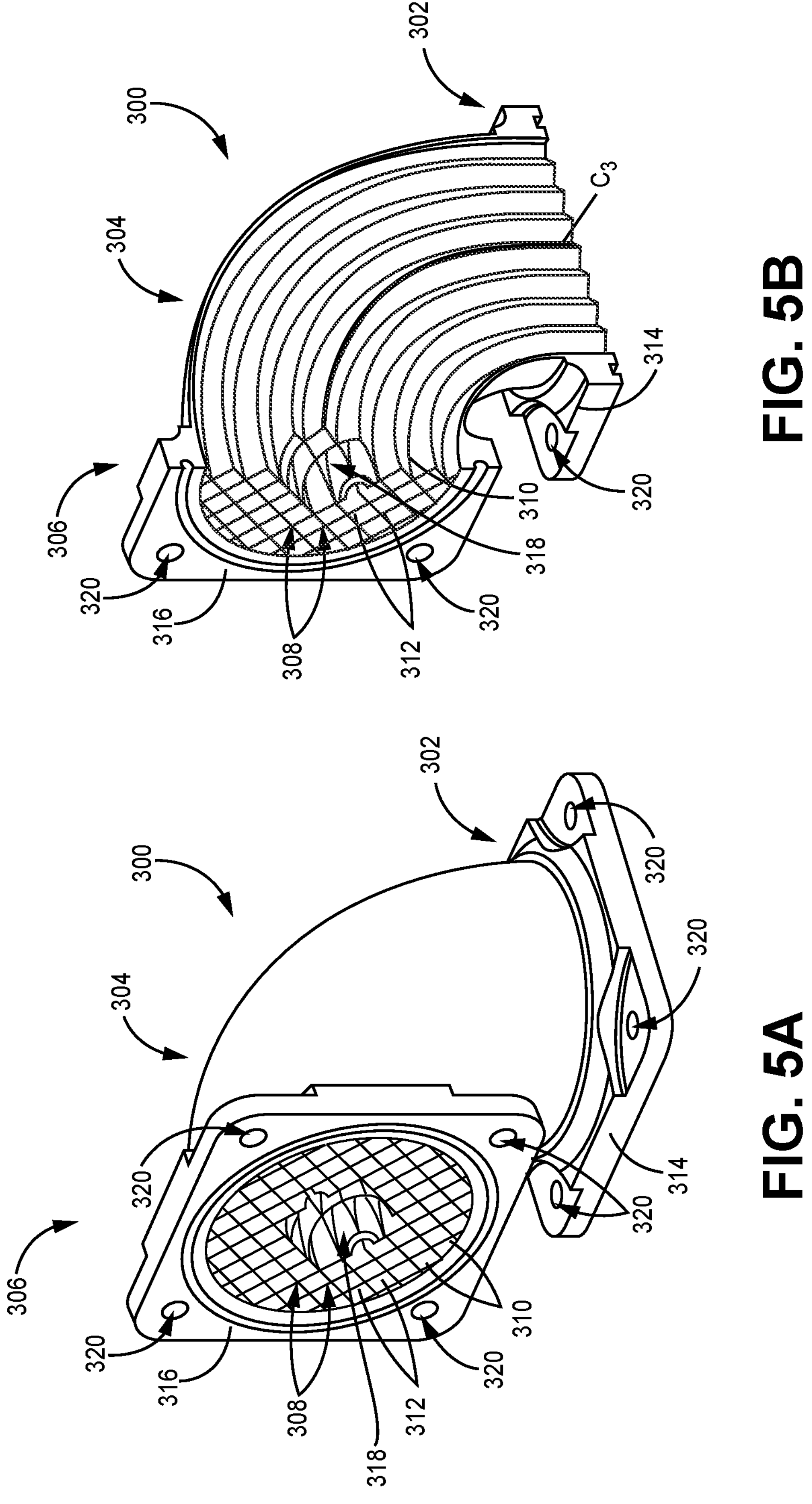
FIG. 5A is a perspective view of a CTB elbow having rectangular channels for use in a MPWC.
FIG. 5B is a perspective view of a cross section of the CTB elbow of FIG. 5A.
Figures 5C, 5D:
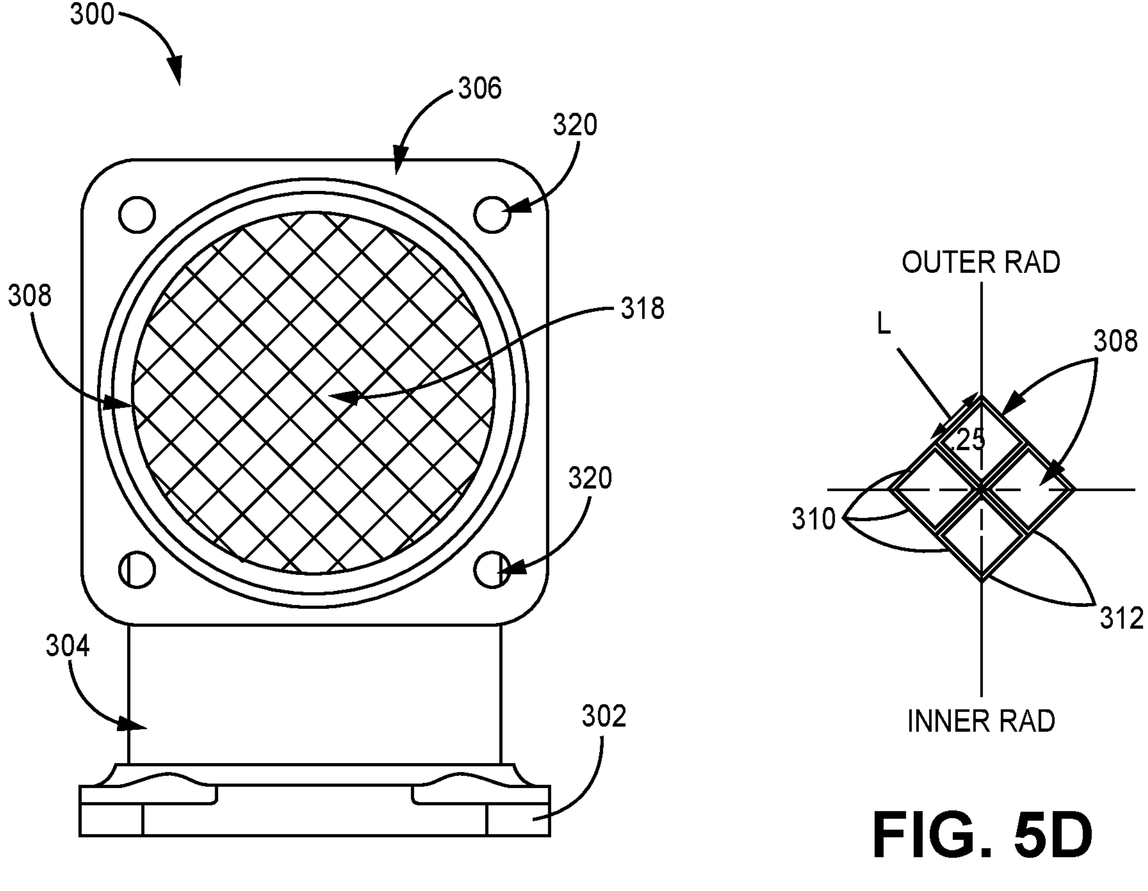
FIG. 5C is a side elevation view of the CTB elbow of FIG. 5A.
FIG. 5D is a cross-sectional view of the rectangular channels within the CTB elbow of FIG. 5A.

FIG. 5A is a perspective view of CTB elbow 300. CTB elbow 300 is oriented along principal curve $C_3$ and includes inlet end 302, body section 304, and outlet end 306. Body section 304 includes channels 308, channel walls 310, and corners 312. In the examples shown in FIGS. 5A-5C, inlet end 302 includes inlet mounting plate 314, and outlet end 306 includes outlet mounting plate 316 and recess 318. Inlet mounting plate 314 and outlet mounting plate 316 can each include openings 320 for receiving connectors (such as, for example, nuts 108 and bolts 110 shown in FIG. 3B). FIG. 5B is a perspective view of a cross section of CTB elbow 300. FIG. 5C is a side elevation view of CTB elbow 300. FIG. 5D is a cross-sectional view of channels 308 within CTB elbow 300. FIGS. 5A-5D will be discussed concurrently below.

The components of CTB elbow 300 (inlet end 302, body section 304, and outlet end 306) can operate in substantially the same way as the components of CTB elbow 200 (described above in reference to FIGS. 4A-4D).

In the example shown in FIGS. 5A-5D, channels 308 have a square cross section in the direction perpendicular to the fluid flow through channels 308 during operation. In other examples, channels 308 can have rectangular, diamond, or other quadrilateral cross sections. Each channel 308 shares at least one channel wall 310 with at least one other channel 308, and each channel 308 thereby directly abuts the channel(s) 308 with which it shares channel wall(s) 310. In some examples, the thickness of channel walls 310 can be approximately 0.020 inches. The size of channels 308 can be uniform or can vary within body section 304. In the example shown in FIG. 5D, the length L of each channel wall 310 (the distance between two corners 312 along a channel wall 310) is approximately 0.25 inches.

As with the hexagonal channels 208 described above in reference to FIGS. 4A-4D, the quadrilateral shape of channels 308 allow each channel 308 to efficiently share channel walls 310 with the adjacent channels 308, while providing a low solidity design for minimum obstruction to the air flow through CTB elbow 300. The size and length-to-diameter ratio of channels 308 can be varied to improve the performance of the particular system in which CTB elbow 300 is used. Corners 312 formed by the quadrilateral geometry provide pockets for coalescing water to form into rivulets as it flows through each channel 308.

Figures 6A, 6B:
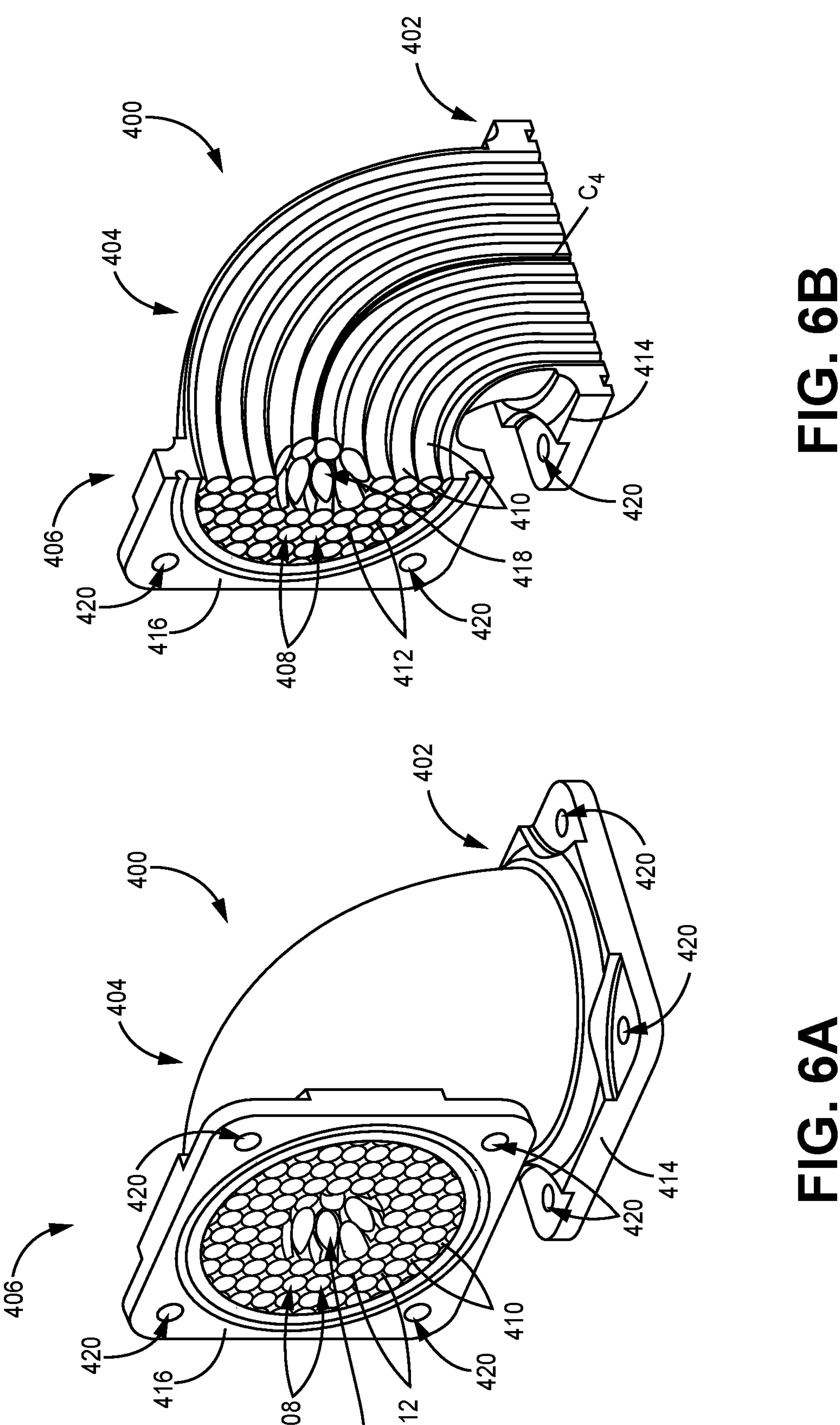
FIG. 6A is a perspective view of a CTB elbow having circular channels for use in a MPWC.
FIG. 6B is a perspective view of a cross section of the CTB elbow of FIG. 6A.
Figures 6C, 6D:
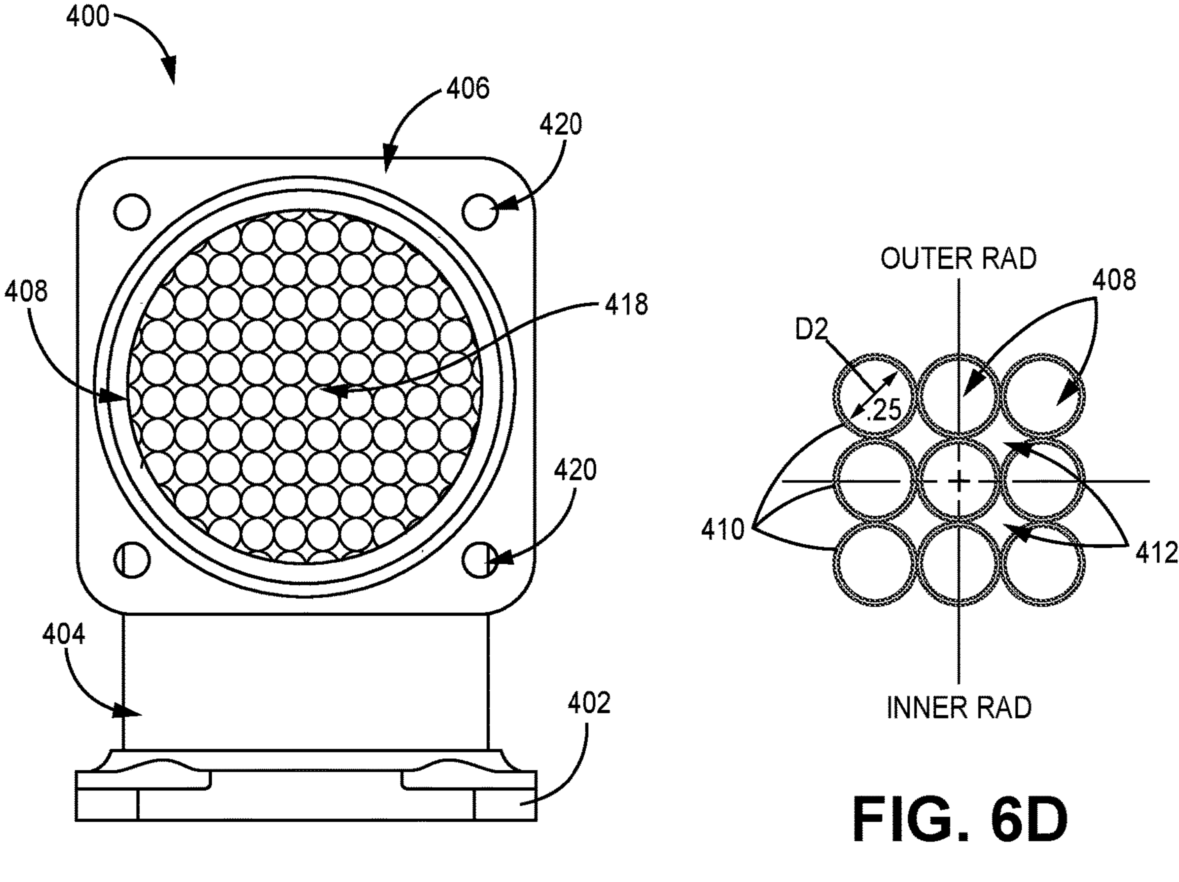
FIG. 6C is a side elevation view of the CTB elbow of FIG. 6A.
FIG. 6D is a cross-sectional view of the circular channels within the CTB elbow of FIG. 6A.

FIG. 6A is a perspective view of CTB elbow 400. CTB elbow 400 is oriented along principal curve $C_4$ and includes inlet end 402, body section 404, and outlet end 406. Body section 404 includes channels 408, channel walls 410, and inter-channel openings 412. In the examples shown in FIGS. 6A-6C, inlet end 402 includes inlet mounting plate 414, and outlet end 406 includes outlet mounting plate 416 and recess 418. Inlet mounting plate 414 and outlet mounting plate 416 can each include openings 420 for receiving connectors (such as, for example, nuts 108 and bolts 110 shown in FIG. 3B). FIG. 6B is a perspective view of a cross section of CTB elbow 400. FIG. 6C is a side elevation view of CTB elbow 400. FIG. 6D is a cross-sectional view of channels 408 within CTB elbow 400. FIGS. 6A-6D will be discussed concurrently below.

The components of CTB elbow 400 (inlet end 402, body section 404, and outlet end 406) can operate in substantially the same way as the components of CTB elbow 200 (described above in reference to FIGS. 4A-4D).

In the example shown in FIGS. 6A-6D, channels 408 have a circular cross section in the direction perpendicular to the fluid flow through channels 408 during operation. The circular cross section of each channel 408 is defined by the channel wall 410 surrounding each channel 408. Each channel 408 thereby directly abuts adjacent channel(s) 408 at one location, but each channel 408 does not share a channel wall 410 with the abutting channel(s) 408. In some examples, the thickness of channel walls 410 can be approximately 0.020 inches. The size of channels 408 can be uniform or can vary within body section 404. In the example shown in FIG. 6D, the diameter $D_2$ of each channel 408 is approximately 0.25 inches.

As channels 408 have a circular cross section, channels 408 do not contain any corners and therefore have fewer areas for droplets to condense and rivulets to form. Additionally, as channels 408 do not share channel walls 410, a design utilizing circular channels 408 will contain inter-channel openings 412. While inter-channel openings 412 are approximately diamond shaped and thus do contain corners, the difference in shape and size between channels 408 and inter-channel openings 412 is associated with a higher pressure drop across CTB elbow 400.

A CTB elbow as described herein provides numerous advantages. The CTB elbow can enable ECS systems without a conventional condenser heat exchanger system. A compact CTB elbow design with simple extruded geometry enables fog to be driven to the outer wall of each extruded channel for coalescing, as opposed to linear CTB designs which require more complex twisting of each channel. Low solidity hexagonal or diamond geometry minimizes flow obstruction and offers corners for water droplets to pool into rivulets. Finally, various extruded patterns, channel sizes and length-to-diameter ratios are possible to increase coalescing of turbine fog for collection within a particular system.

Discussion of Possible Embodiments

The following are non-exclusive descriptions of possible embodiments of the present invention.

A CTB elbow for a water collector and oriented about a principal curve includes an inlet end, an outlet end, and a body section fluidly connecting the inlet and outlet ends. The inlet end can receive a fluid flow in an at least partially gaseous state in an incoming direction. The outlet end can discharge the fluid flow in an at least partially liquid state in an outgoing direction. The body section can condense at least a portion of the fluid flow from a gaseous state into a liquid state. The body section includes channels defined by a plurality of channel walls and extending along the body section from the inlet end to the outlet end, and has a curved profile such that the outgoing direction of the fluid flow is not parallel to the incoming direction of the fluid flow.

The conical bearing of the preceding paragraph can optionally include, additionally and/or alternatively, any one or more of the following features, configurations and/or additional components:

A CTB elbow for a water collector and oriented about a principal curve according to an exemplary embodiment of the present invention, among other possible things, includes an inlet end, an outlet end, and a body section fluidly connecting the inlet and outlet ends. The inlet end can receive a fluid flow in an at least partially gaseous state in an incoming direction. The outlet end can discharge the fluid flow in an at least partially liquid state in an outgoing direction. The body section can condense at least a portion of the fluid flow from a gaseous state into a liquid state. The body section includes channels defined by a plurality of channel walls and extending along the body section from the inlet end to the outlet end, and has a curved profile such that the outgoing direction of the fluid flow is not parallel to the incoming direction of the fluid flow.

A further embodiment of the foregoing CTB elbow, wherein each channel shares at least one channel wall with at least one other channel such that each channel directly abuts the at least one other channel. The cross section of each channel in a perpendicular direction to the fluid flow through each channel is a polygon having at least three corners.

A further embodiment of any of the foregoing CTB elbows, wherein each of the channels has a hexagonal cross section.

A further embodiment of any of the foregoing CTB elbows, wherein a diameter of each channel from a midpoint of a channel wall to a midpoint of another channel wall across the channel is approximately 0.25 inches.

A further embodiment of any of the foregoing CTB elbows, wherein each of the channels has a rectangular cross section.

A further embodiment of any of the foregoing CTB elbows, wherein a length of each channel wall is approximately 0.25 inches.

A further embodiment of any of the foregoing CTB elbows, wherein each of the channels has a circular cross section.

A further embodiment of any of the foregoing CTB elbows, wherein each of the channels has a diameter of approximately 0.25 inches.

A further embodiment of any of the foregoing CTB elbows, wherein the CTB elbow turns 90 degrees between the inlet end and the outlet end.

A further embodiment of any of the foregoing CTB elbows, wherein the outlet end includes a recess for a swirl vane section of the water collector.

A further embodiment of any of the foregoing CTB elbows, wherein the CTB elbow is additively manufactured and the channels are extruded along the body section.

A method of manufacturing any of the foregoing CTB elbows can include additively manufacturing the inlet end.

The body section can be additively manufactured, including building the plurality of channel walls along a centerline of the CTB elbow. The outlet end can be additively manufactured.

A further embodiment of the foregoing method, wherein building the plurality of channels walls comprises building the plurality of channel walls in a build direction which is not parallel to the plurality of channel walls.

A mid-pressure water collector includes a coalescing tube bundle elbow, a swirl vane section, and a water collection section. The coalescing tube bundle elbow includes an inlet end, an outlet end, and a body section fluidly connecting the inlet and outlet ends. The inlet end can receive a fluid flow in an at least partially gaseous state in an incoming direction. The outlet end can discharge the fluid flow in an at least partially liquid state in an outgoing direction. The body section can condense at least a portion of the fluid flow from a gaseous state into a liquid state. The body section includes channels defined by a plurality of channel walls and extending along the body section from the inlet end to the outlet end, and has a curved profile such that the outgoing direction of the fluid flow is not parallel to the incoming direction of the fluid flow. The swirl vane section is downstream of the coalescing tube bundle elbow and is fluidly connected to the outlet end of the coalescing tube bundle elbow. The swirl vane section includes a swirl vane assembly and an inlet duct surrounding the swirl vane assembly. The water collection section is downstream of the swirl vane section and is fluidly connected to the swirl vane assembly. The water collection section includes a water collection can and an ejector.

The mid-pressure water collector of the preceding paragraph can optionally include, additionally and/or alternatively, any one or more of the following features, configurations and/or additional components:

A mid-pressure water collector according to an exemplary embodiment of the present invention, among other possible things, includes a coalescing tube bundle elbow, a swirl vane section, and a water collection section. The coalescing tube bundle elbow includes an inlet end, an outlet end, and a body section fluidly connecting the inlet and outlet ends. The inlet end can receive a fluid flow in an at least partially gaseous state in an incoming direction. The outlet end can discharge the fluid flow in an at least partially liquid state in an outgoing direction. The body section can condense at least a portion of the fluid flow from a gaseous state into a liquid state. The body section includes channels defined by a plurality of channel walls and extending along the body section from the inlet end to the outlet end, and has a curved profile such that the outgoing direction of the fluid flow is not parallel to the incoming direction of the fluid flow. The swirl vane section is downstream of the coalescing tube bundle elbow and is fluidly connected to the outlet end of the coalescing tube bundle elbow. The swirl vane section includes a swirl vane assembly and an inlet duct surrounding the swirl vane assembly. The water collection section is downstream of the swirl vane section and is fluidly connected to the swirl vane assembly. The water collection section includes a water collection can and an ejector.

A method of condensing water vapor from an air flow within a water collection system includes receiving a fluid flow in an at least partially gaseous state in an incoming direction with an inlet end of a CTB elbow. At least a portion of the fluid flow is condensed from a gaseous state into a liquid state with a body section of the CTB elbow by directing the fluid flow through a plurality of channels extending along the body section from the inlet end to the outlet end and along a curved profile of the body section. This changes a direction of the fluid flow such that an outgoing direction of the fluid flow is not parallel to the incoming direction of the fluid flow. The fluid flow in an at least partially liquid state is discharged in the outgoing direction with an outlet end of the CTB elbow. The fluid flow is spun along a swirl vane inlet duct with a swirl vane assembly and thereby separating a liquid portion of the fluid flow from a gas portion of the fluid flow. A swirl vane section which is downstream of the CTB elbow and fluidly connected to the outlet end of the CTB elbow comprises the swirl vane inlet duct and the swirl vane assembly. The liquid portion of the fluid flow is collected with a water collection can of a water collection section which is downstream of the swirl vane section and fluidly connected to the swirl vane section. The gas portion of the fluid flow is directed out of the water collection can.

The method of the preceding paragraph can optionally include, additionally and/or alternatively, any one or more of the following features, configurations and/or additional components:

A method of condensing water vapor from an air flow within a water collection system according to an exemplary embodiment of the present invention, among other possible things, includes receiving a fluid flow in an at least partially gaseous state in an incoming direction with an inlet end of a CTB elbow. At least a portion of the fluid flow is condensed from a gaseous state into a liquid state with a body section of the CTB elbow by directing the fluid flow through a plurality of channels extending along the body section from the inlet end to the outlet end and along a curved profile of the body section. This changes a direction of the fluid flow such that an outgoing direction of the fluid flow is not parallel to the incoming direction of the fluid flow. The fluid flow in an at least partially liquid state is discharged in the outgoing direction with an outlet end of the CTB elbow. The fluid flow is spun along a swirl vane inlet duct with a swirl vane assembly and thereby separating a liquid portion of the fluid flow from a gas portion of the fluid flow. A swirl vane section which is downstream of the CTB elbow and fluidly connected to the outlet end of the CTB elbow comprises the swirl vane inlet duct and the swirl vane assembly. The liquid portion of the fluid flow is collected with a water collection can of a water collection section which is downstream of the swirl vane section and fluidly connected to the swirl vane section. The gas portion of the fluid flow is directed out of the water collection can.

A further embodiment of the foregoing method, wherein condensing the at least a portion of the fluid flow from the gaseous state into the liquid state with the body section of the CTB elbow by directing the fluid flow through the plurality of channels comprises directing the fluid flow through a plurality of hexagonal channels.

A further embodiment of any of the foregoing methods, wherein condensing the at least a portion of the fluid flow from the gaseous state into the liquid state with the body section of the CTB elbow by directing the fluid flow through the plurality of channels comprises directing the fluid flow through a plurality of quadrilateral channels.

A further embodiment of any of the foregoing methods, wherein the outgoing direction of the fluid flow is approximately perpendicular to the incoming direction of the fluid flow.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coalescing tube bundle (CTB) elbow for a water collector and oriented about a principal curve, the CTB elbow comprising:

an inlet end for receiving a fluid flow in an at least partially gaseous state in an incoming direction, wherein a plane of the inlet end is orthogonal to the principal curve;

an outlet end for discharging the fluid flow in an at least partially liquid state in an outgoing direction, wherein a plane of the outlet end is orthogonal to the principal curve; and a body section, extending about the principal curve and fluidly connecting the inlet end to the outlet end, for condensing at least a portion of the fluid flow from a gaseous state into a liquid state, comprising a plurality of channels defined by a plurality of channel walls and extending along at least a portion of the body section from the inlet end and towards the outlet end, and having a curved profile such that the outgoing direction of the fluid flow is not parallel to the incoming direction of the fluid flow, and wherein:

a first subset of the plurality of channel walls extends from the inlet end to a recess, the recess extending from the outlet end and partially into the body section; and a second subset of the plurality of channel walls extends from the inlet end to the outlet end.

2. The CTB elbow of claim 1, wherein each channel shares at least one channel wall with at least one other channel such that each channel directly abuts the at least one other channel, and the cross section of each channel in a perpendicular direction to the fluid flow through each channel is a polygon having at least three corners.

3. The CTB elbow of claim 2, wherein each of the channels has a hexagonal cross section.

4. The CTB elbow of claim 3, wherein a diameter of each channel from a midpoint of a channel wall to a midpoint of another channel wall across the channel is approximately 0.25 inches.

5. The CTB elbow of claim 2, wherein each of the channels has a rectangular cross section.

6. The CTB elbow of claim 5, wherein a length of each channel wall is approximately 0.25 inches.

7. The CTB elbow of claim 1, wherein each of the channels has a circular cross section.

8. The CTB elbow of claim 7, wherein each of the channels has a diameter of approximately 0.25 inches.

9. The CTB elbow of claim 1, wherein the CTB elbow turns 90 degrees between the inlet end and the outlet end.

10. The CTB elbow of claim 1, wherein the CTB elbow is additively manufactured and the channels are extruded along at least the portion of the body section.

11. A method of manufacturing the CTB elbow of claim 1, the method comprising:

additively manufacturing the inlet end;

additively manufacturing the body section, wherein additively manufacturing the body section comprises building the plurality of channel walls along a centerline of the CTB elbow; and additively manufacturing the outlet end.

12. The method of claim 11, wherein building the plurality of channels walls comprises building the plurality of channel walls in a build direction which is not parallel to the plurality of channel walls.

13. A mid-pressure water collector comprising:

a CTB elbow oriented about a principal curve and comprising:

an inlet end for receiving a fluid flow in an at least partially gaseous state in an incoming direction, wherein a plane of the inlet end is orthogonal to the principal curve;

an outlet end for discharging the fluid flow in an at least partially liquid state in an outgoing direction, wherein a plane of the outlet end is orthogonal to the principal curve; and a body section, extending about the principal curve and fluidly connecting the inlet end to the outlet end, for condensing at least a portion of the fluid flow from a gaseous state into a liquid state, comprising a plurality of channels defined by a plurality of channel walls and extending along at least a portion of the body section from the inlet end and towards the outlet end, and having a curved profile such that the outgoing direction of the fluid flow is not parallel to the incoming direction of the fluid flow , and wherein:

a first subset of the plurality of channel walls extends from the inlet end to a recess, the recess extending from the outlet end and partially into the body section; and a second subset of the plurality of channel walls extends from the inlet end to the outlet end;

a swirl vane section downstream of the CTB elbow, fluidly connected to the outlet end of the CTB elbow, and comprising:

a swirl vane assembly comprising a swirl vane center body extending at least partially into the outlet end, wherein at least a portion of the swirl vane center body is received in the recess; and an inlet duct surrounding the swirl vane assembly; and a water collection section downstream of the swirl vane section, fluidly connected to the swirl vane section, and comprising:

a water collection can; and an ejector.

14. The mid-pressure water collector of claim 13, wherein a profile of the recess substantially conforms to a profile of the portion of the swirl vane center body that extends into the outlet end of the CTB elbow.

* * * * *